(12) United States Patent
Bow

(10) Patent No.: US 10,449,688 B2
(45) Date of Patent: Oct. 22, 2019

(54) WORKPIECE TOOL AND GUIDE

(71) Applicant: D. Keith Bow, Corfu, NY (US)

(72) Inventor: D. Keith Bow, Corfu, NY (US)

( * ) Notice: Subject to any disclaimer, the term of this patent is extended or adjusted under 35 U.S.C. 154(b) by 256 days.

(21) Appl. No.: 15/677,717

(22) Filed: Aug. 15, 2017

(65) Prior Publication Data
US 2018/0050464 A1    Feb. 22, 2018

Related U.S. Application Data

(60) Provisional application No. 62/377,565, filed on Aug. 20, 2016.

(51) Int. Cl.
*B27B 25/10* (2006.01)
*B27B 27/02* (2006.01)
*B27G 19/06* (2006.01)
*B27B 5/29* (2006.01)
*G01B 3/04* (2006.01)

(52) U.S. Cl.
CPC .............. *B27B 25/10* (2013.01); *B27B 5/29* (2013.01); *B27B 27/02* (2013.01); *B27G 19/06* (2013.01); *G01B 3/04* (2013.01)

(58) Field of Classification Search
CPC ........ B27G 19/02; B27G 19/04; B23D 47/04; B23D 47/045; B27C 5/06; B23Q 3/002; B23Q 3/005; B23Q 3/18; B23Q 3/183; B23Q 3/186; B27B 25/10
USPC ................... 144/250.12, 250.2, 253.6, 253.1
See application file for complete search history.

(56) References Cited

U.S. PATENT DOCUMENTS

| | | | | |
|---|---|---|---|---|
| 5,875,827 A | * | 3/1999 | Brutscher | B27B 25/10 144/253.1 |
| 7,040,206 B2 | * | 5/2006 | Wang | B27B 25/10 83/436.2 |
| 7,140,286 B2 | * | 11/2006 | Schwartz | B23D 47/04 83/446 |
| 9,440,371 B2 | * | 9/2016 | van Valkenburg | B23D 47/04 |

* cited by examiner

*Primary Examiner* — Matthew Katcoff
(74) *Attorney, Agent, or Firm* — Duane C. Basch; Basch & Nickerson LLP

(57) ABSTRACT

A multi-purpose tool guide apparatus for use with woodworking and similar applications where the apparatus can be employed as either a stationary guide for applying a biasing force against a workpiece or as a hand-held tool for pushing or controlling a workpiece that us being cut or shaped. The multi-purpose apparatus includes features and components that allow for it to be configured and employed in various configurations.

20 Claims, 8 Drawing Sheets

WORKPIECE TOOL AND GUIDE

This application claims priority under 35 U.S.C. § 119(e), from U.S. Provisional Patent Application No. 62/377,565 for a BAND SAW FEATHERBOARD & TOOL FOR MICRO FENCE ADJUSTMENTS (sic), filed Aug. 20, 2016, by D. Keith Bow, which is hereby incorporated by reference in its entirety.

The disclosed embodiments generally relate to devices or tools for use in woodworking, and in particular a tool and guide for use on workpieces. The tool includes a handle grip implement for manipulating a workpiece while it is engaged with a cutting blade, such as a band or circular table saw. Furthermore, the tool may be employed as an accessory that is used in multiple ways for holding, handling or pushing a workpiece in relation to a cutting edge of some type, particularly for woodworking.

BACKGROUND AND SUMMARY

Workpiece guidance devices are known to be used with a worktable or similar work surface, such as a table saw or shaper, to safely guide a workpiece along the table as it is processed by a cutting implement, such as a saw blade or other cutting tool bit. Typically the guide-on tool is mounted on, or attached to, a worktable, and adjusted to a desired position relative to a blade to accommodate the width (and possibly the height) of the stock to be cut. In the case of a band saw, when cutting into a board having a tall height to width ratio, there is a need to apply a sideward pressure along the height of the workpiece to ensure a uniform and perpendicular cut, while still allowing the workpiece to be fed between the blade and guide-on with a nominal infeed force. Accordingly, there exists a need for a device capable of providing a force onto the workpiece that is perpendicular to the saw blade, while at the same time maintaining a manageable infeed force. Furthermore, in woodworking, unlike a metal machining operation, it is typical to have the workpiece unsecured as it moves passed a fixed cutting blade. Therefore the workpiece typically is not mounted to a work surface and is only held in position by one or two hands of the operator, which provides a significant safety issue, as well as the accuracy of the cut.

Disclosed in embodiments herein A tool guide apparatus comprising: a main body with an opening therein defining a grip about which the main body may be grasped, said main body including a bottom edge having a first mating cross-section, where said bottom edge further includes a detent; and at least one attachment slidably attached to the bottom edge of said main body, where said at least one attachment has a longitudinal channel therein, in a shape complimentary to the first mating cross-section, to receive the bottom edge, said at least one attachment engaged by the detent to maintain the main body in a position with the at least one attachment.

Also disclosed herein is a tool guide apparatus for use on a work surface, in conjunction with a fence, to apply a force onto a large or irregular-surfaced workpiece being fed along a fence. The tool guide apparatus comprises: a body, including a first end with a T-shaped groove extending parallel with the first end, and a T-shaped bottom edge, said bottom edge including at least one spring-biased pawl positioning mechanism protruding therefrom; and at least one or more flexible member extending from at least one edge of the body, said flexible member being removably attached to the body by a T-shaped feature along one edge thereof that is received by a complementary T-shaped groove in the edge of the body; and an adjustable mounting channel, operatively retained on the work surface, wherein said channel being suitable for slidably receiving the T-shaped bottom edge of the body therein, said channel being movably engaged by a pawl mechanism so as to provide a cinching force resisting movement between the body and the channel wherein upon use, position of the body is adjusted relative to the channel to provide the force against the workpiece via contact with the flexible member extending from at least one end of the body.

Further disclosed in embodiments herein is a tool guide apparatus comprising: a main body with an opening therein and defining a grip about which the main body may be grasped, said main body including a bottom edge having a T-shaped cross-section, where said bottom edge further includes a releasable detent; said main body further including a flexible member removably attached to the main body along a side edge, wherein said flexible member is attached by slidable engagement of an edge of the flexible member within a channel on the side edge of said main body; and an attachment slidably attached to the bottom edge of said main body, where said attachment includes: a longitudinal channel therein, in a shape complimentary to the first mating cross-section, to receive the bottom edge, said attachment engaged by the detent to maintain the main body in a position with the attachment; and a table coupling mechanism to allow the main body to be employed relative to a work table via the attachment, wherein said table coupling mechanism includes a longitudinal slot in a planar bottom thereof, and an adjustable cam extends beneath the planar bottom, said cam having a shoulder that slides within the slot, said adjustable cam further including a fastener for frictionally affixing the cam at a desired position along the slot, and where the cam frictionally contacts a recess on the work table.

Figure 1A:
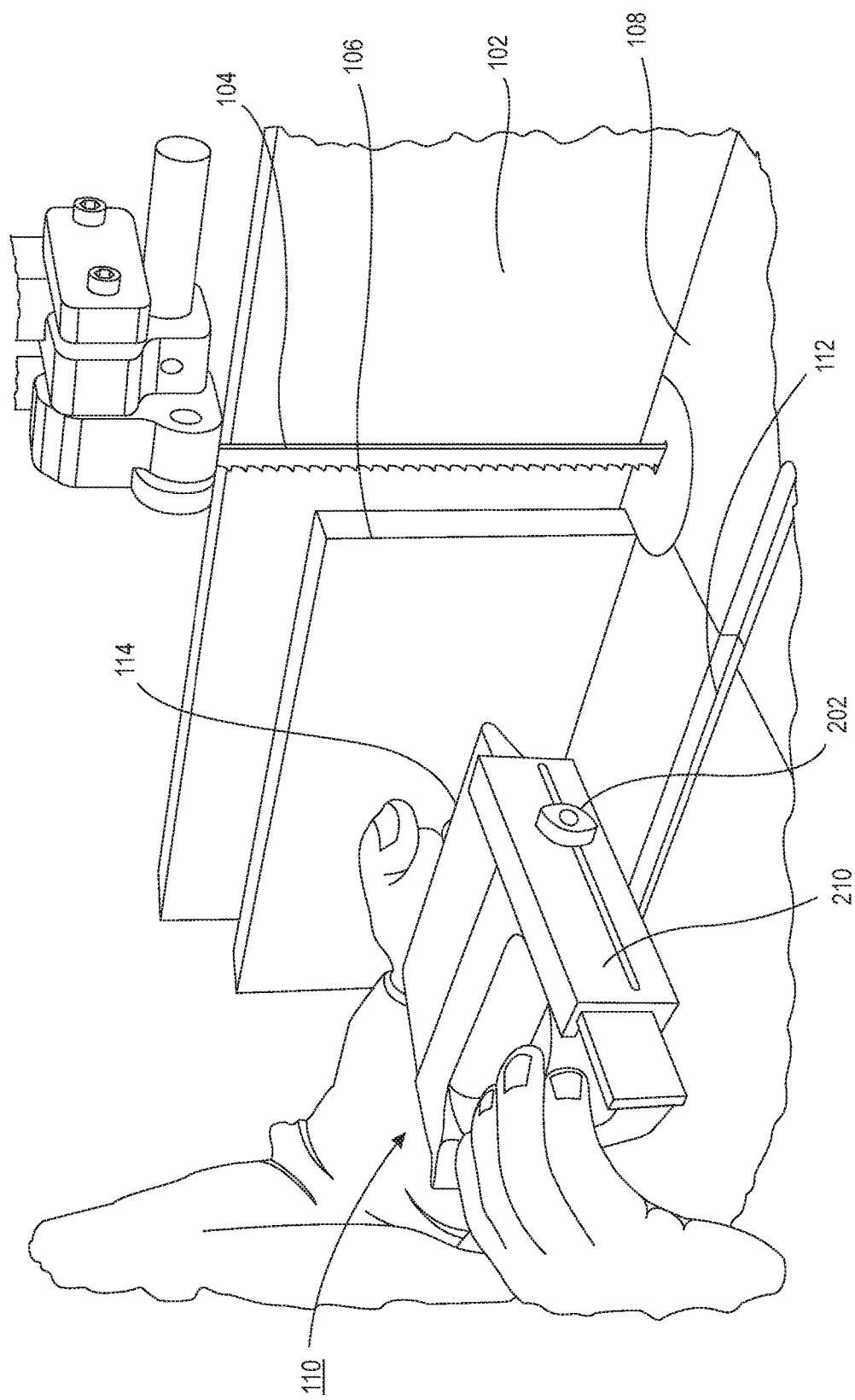
FIGS. 1A-1E show a sequence of perspective views of the tool guide in use on a band saw employing a fence in accordance with a disclosed embodiment.
Figure 1B:
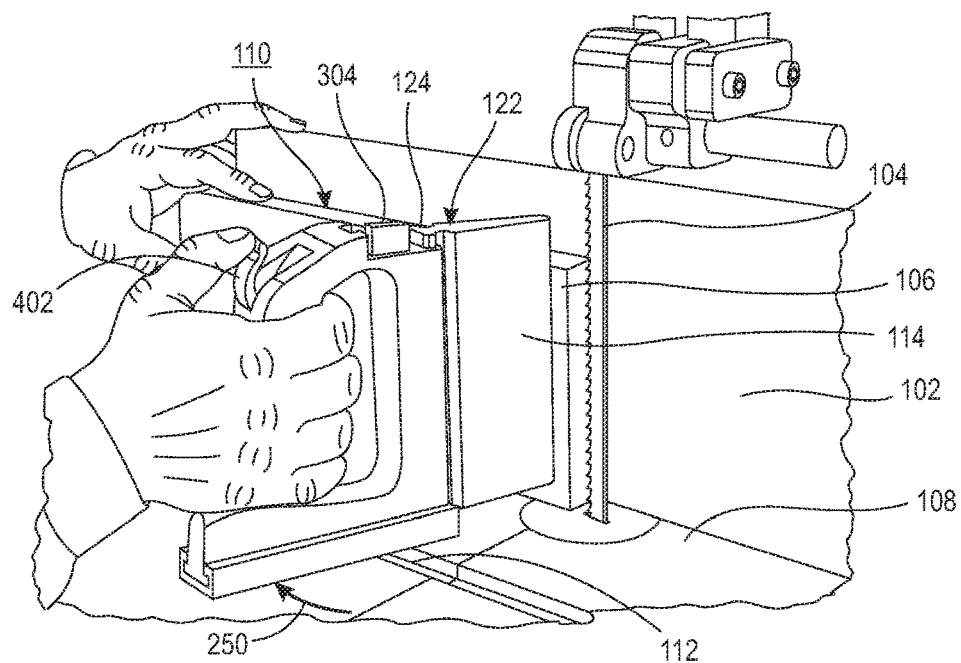
Figure 1C:
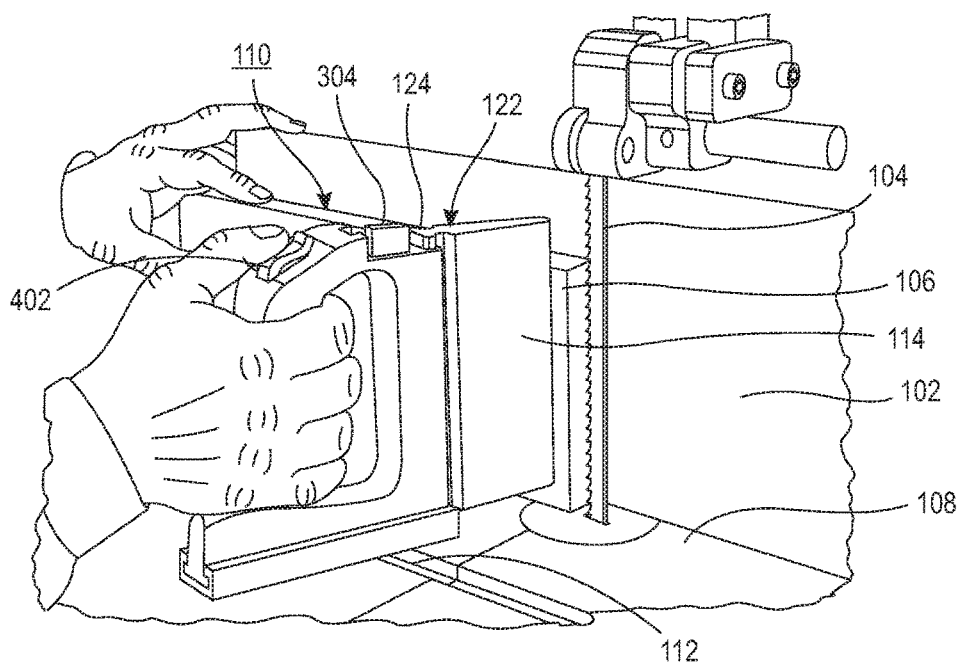
Figure 1D:
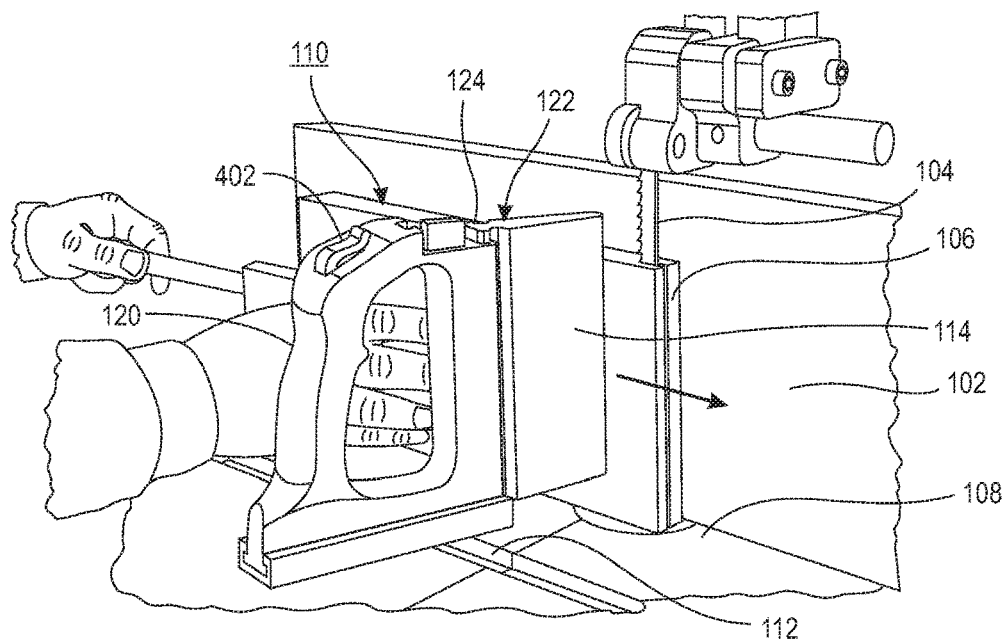
Figure 1E:
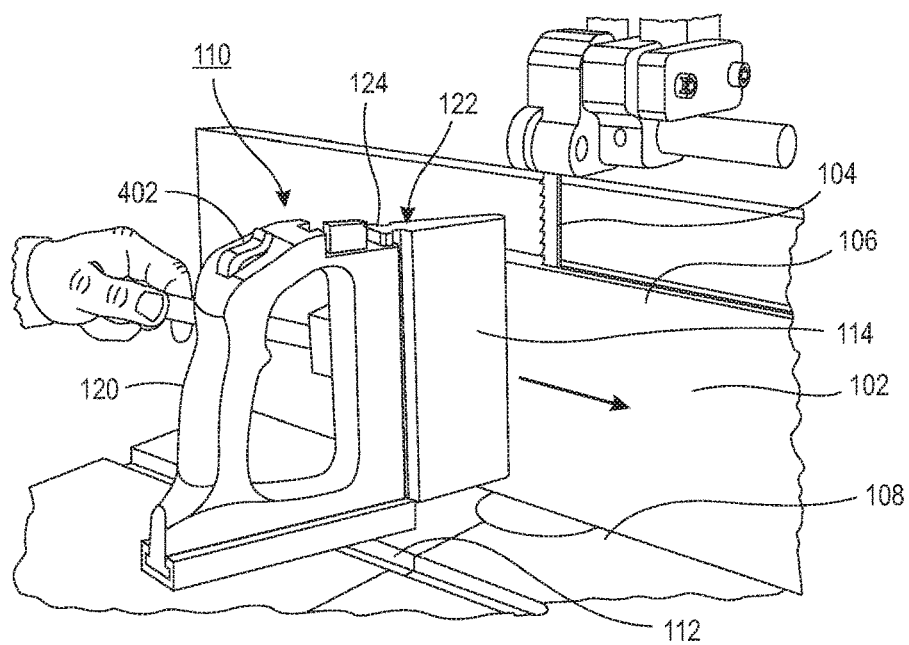

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Referring to FIGS. 1A-1E, depicted therein is an embodiment of the tool guide apparatus 110 designed for use with a band saw 116, joiner, or similar device suitable for cutting a workpiece fed along a fence 102 or similar guide. In the depicted embodiment, Apparatus 110 is designed to apply a nominal perpendicular force against the vertical surface of a tall and/or irregular-surface workpiece being fed toward blade 104 along fence 102. In the illustrated embodiment the tool guide apparatus 110 includes a main body 120 having a flexible member 114 removably attached thereto, via a T-shaped channel, as shown in FIG. 4. Although depicted and described as T-shaped, it will be appreciated that alternative mating shapes such as V-shaped, keyhole-shaped cross-sections or profiles may be employed as well.

As illustrated, the vertical edge of the main body 120 has a channel running the length thereof, and the flexible member 114 has a complimentary or mating edge cross-section so that the flexible member edge can be slidably engaged in the channel to attach or affix the flexible member to the main body. As shown, for example in FIGS. 1D and 1E, in use the apparatus 110 is positioned and attached to the work surface to provide a guide that is compliant with the surface of the workpiece, which essentially biases and captivates the work piece against the fence. Moreover, the presence of the flexible member 114 between the operator and the blade 104 allows the tool guide apparatus 110 to also function as a shield.

Figure 4A:
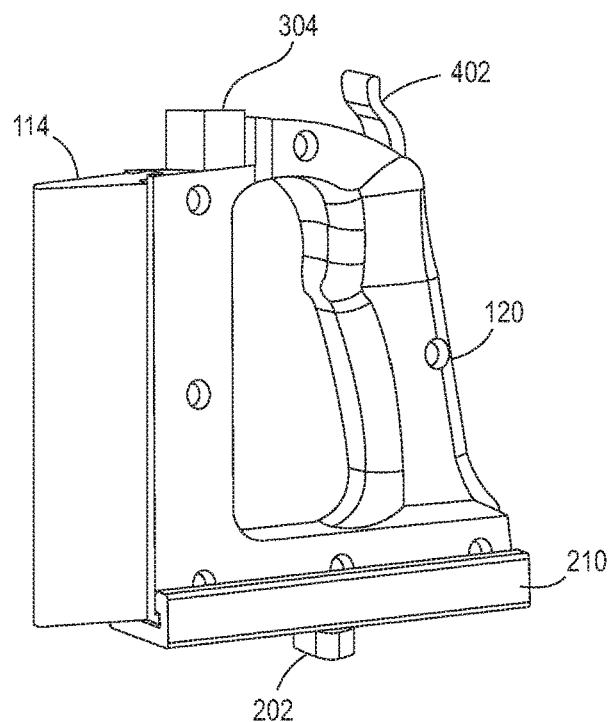
FIG. 4A is a side perspective view of an embodiment of the tool guide in accordance with the embodiment of FIGS. 1A-1E.
Figure 4B:
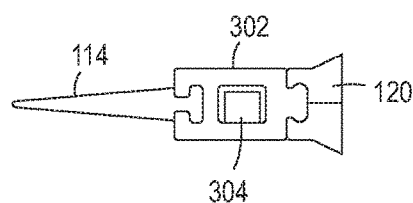
FIG. 4B and FIG. 4C are, respectively, a top and a side perspective view of an extension that may be employed with the tool guide in an alternative embodiment.

The cross-sectional profile of the flexible member 114, for example as depicted in FIG. 4B, may be characterized as being tapered from a thicker portion near the edges attached to the main body 120, to a narrowing portion at its tip or vertex which typically contacts the workpiece. The tapered profile of the flexible member results in a variable bending moment to accommodate the contours of the workpiece, while applying a biasing force to work piece 106. As will be appreciated, the position of the tool guide apparatus 110 is adjustable in relationship to the workpiece. And, as a result, the amount of force applied by the bending of the flexible member 114 may also be adjusted. As will be appreciated, such a biasing force reduces or eliminates the necessity for the operator to have a hand placed in proximity to the blade 104 in order to maintain an even and steady cut. The configuration of flexible member 114 may also be customized for the particular tasks for which the tool guide apparatus 110 is being employed. For example, in one embodiment, instead or as part of flexible member, the outermost extent of member 114 may have one or more rollers or wheels, or be made from or coated with a low-friction material on at least the tip, to permit the workpiece to more easily roll or slide past the end of the member. Member 114 may also be formed in the shape of a generally rectangular pad that would allow the tool guide apparatus to be similarly inserted into the channel or other receptacle of a work table and then adjusted relative to the coupler in order to apply a clamping force to a workpiece on the table. Indeed, multiple tool guide apparatus may be employed in opposition to one another to clamp a workpiece on the surface as well.

Figure 2A:
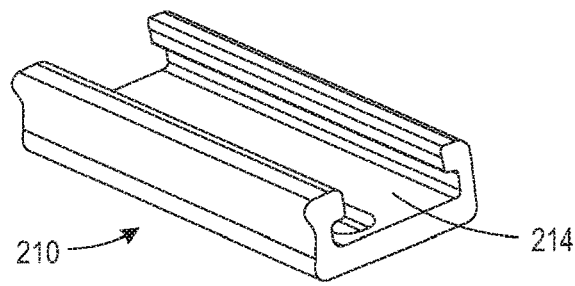
FIGS. 2A-2C are various perspective drawings of the T-channel interface between the tool guide and the work surface in accordance with the embodiment of FIGS. 1A-1E, and FIGS. 2D-2E are illustrations of alternative cams as found in embodiments of FIGS. 2A-2C.
Figure 2B:
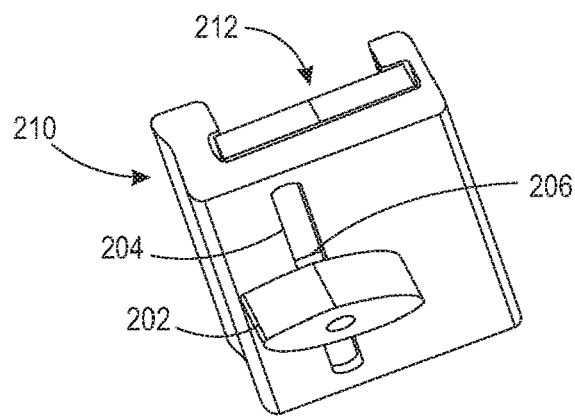
Figure 2C:
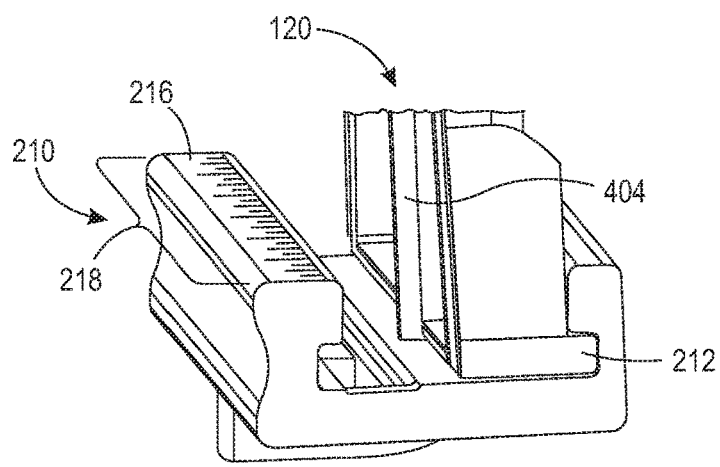
Figure 2D:
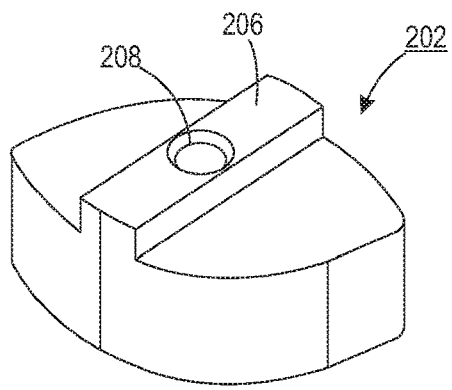

Also referring to FIGS. 2A-2C, these figures illustrate the details of an attachment 210 that may be employed with the main body in an adaptable manner to facilitate apparatus 110 mounting to channel 112 of work surface 108. In the figures, table coupling mechanism (coupler) 210 serves as a connection between the apparatus main body 120 and a work table or surface 108, to operatively retain the position tool guide apparatus 110 on the work surface, the coupler including a complimentary T-shaped longitudinal channel 214 suitable for slidably receiving the T-shaped bottom edge 212 of body 120 therein. As illustrated in FIGS. 2A-2C, the bottom edge 212 can slide or move longitudinally beneath shoulders of channel 214. As with the side edge, the profile of the bottom edge of the main body and the channel of the coupling mechanism should, in order to slidably engage one another, have complimentary shapes, that as an alternative to being T-shaped, could be V-shaped, keyhole-shaped, or similar mating shapes. A detailed perspective view of cam 202 is found in FIG. 2D. In the illustrated configuration of FIG. 2D, the cam will only lock the position of the coupler relative to a channel in one (clockwise) direction.

Figure 2E:
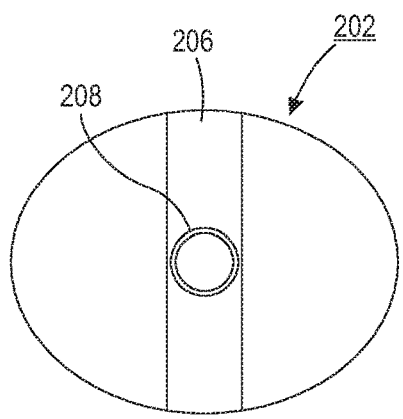

Also referring briefly to FIG. 2E, depicted therein is a top view of an alternative embodiment for cam 202, where the cam may be inserted into a channel 108, and used to "lock" the position of coupler 210 by rotating the coupler (and apparatus 110) in either a clockwise (e.g., arrow 250) or counter-clockwise direction because of the oval shape. The alternative cam configuration continues to include a shoulder 206 for insertion into and movement along slot 204 to adjust the cam position. The center of the cam includes screw hole 208 into which a threaded fastener may be inserted from the top of the coupler, and upon tightening the fastener the position of the cam is fixed relative to the coupler.

Furthermore, the bottom edge of main body 120 further includes a locking mechanism such as a detent, whereby an attachment such as coupler 210 is engaged by the locking mechanism to maintain the position of the body relative to the attachment as will be described in more detail below relative to FIG. 5.

Also contemplated is a measuring scale (ruler) 218 along at least one surface 216 of the coupler 210, so that the coupler may further be employed in setup of the work surface, cutting device, workpiece, etc. The scale 218 may also be used to view the relative position of the body 120 and the coupler 210 so that the configuration may be replicated at a subsequent time.

Referring again to FIGS. 1A-1E, in use, the operator first positions the cam 202 relative to the coupler 210, so the apparatus may be positioned to guide workpiece 106. The user then places the apparatus 110 into an upright position, on the work surface 108, where the cam is located within the channel or groove 112. This is done with the apparatus oriented perpendicular to the channel. Once the cam is in the channel, the apparatus is swung in the direction of arrow 250 to "lock" the cam relative to the channel. Typically the angle is on the order of 15-degrees, although angles of 5-30 degrees may be suitable to allow the cam to be held against the channel walls.

As illustrated tool guide apparatus 110 may be positioned with one hand grasping a handle-shaped portion of main body 120 in order to adjust the position of the guide relative to workpiece 106. The operator has control over the position of the body 120 relative to the coupler 210 and as a result is able to place the contact the flexible member 114, extending from the first end of body 120 into contact against the workpiece 106 and thereby obtain a desired force to be applied to the workpiece.

The tool guide apparatus 110, mounted within the interface coupler 210, is further operatively attached to the table 104 by a cam-shaped locking member 202 having a shoulder 206 positioned within guideway or slot 204 of interface coupler 210 and further engaged into channel 112 of the work surface 108. In summary, table coupling mechanism 210 includes a longitudinal slot 204 in a planar bottom thereof, and an adjustable cam 202 extends beneath the planar bottom, the cam having a shoulder 206 that slides within the slot. The adjustable cam further including a fastener in contact with the inner surface of channel 214 for frictionally affixing the cam at the desired position along the slot.

Figure 3:
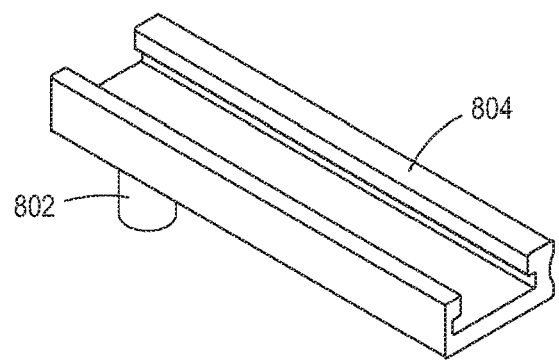
FIG. 3 is an alternative design for a component of the embodiment disclosed in accordance with the embodiment of FIGS. 1A-1E.

As noted above, the tool guide apparatus 110 is rotated to bring the cam into frictional contact with the edges of channel 112 and thereby secures the interface coupler 210 and body 120 therein, in a fixed position. Conversely, as seen in FIG. 3 interface coupler 210 includes post 802, in lieu of cam 202, in order to allow the apparatus to use a coupler 210 by mounting the coupler within a hole in the work surface, in a manner similar to that discussed in the case of cam 202.

Figure 4C:
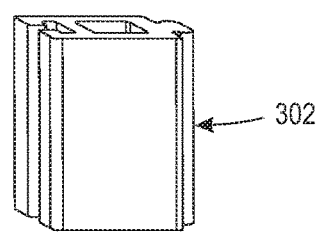

As previously stated body 120 has at least one flexible member 114, engaged within the first side of the body nearest to blade 104. Flexible member 114 is removably attached to the body 120 via a T-shaped edge 124 along one side thereof that is received by a complementary T-shaped groove 122 in body 120. Although a T-shaped cross-section of profile is depicted, it will, once again, be understood that alternative mating shapes may be employed along the edges of the flexible member and the body. It is further contemplated, in an alternative embodiment, that a second flexible member 302 could be attached to the upper end of body 120 (e.g., placed over rectangular post 304 as depicted in FIGS. 4B, 4C). While an interlocking, slidable T-shaped configuration is envisioned any means may be used to attach the flexible member 114 to body 120, such as an adhesive, molding within the body, fasteners, etc. Nevertheless, it is desirable to have the flex member removable to accommodate replacement with various profiles and members having alternative flexure properties.

In regard to the material composition of the flexible member 114, various types of foams or similar flexible materials may be used. As described, for example, in U.S. patent application Ser. No. 15/073,864 for an ANTI-KICK-BACK DEVICE, by D. Keith Bow, filed Mar. 18, 2016, hereby incorporated by reference in its entirety, the flexible member(s) may be made from an elastic material such as high density foam. Possible materials contemplated include a deformable material such as a high density, closed cell ethylene vinyl acetate (EVA) foam. Moreover, urethane-based compositions, or other materials, may be employed for the rigid body 120. Also contemplated is the horizontal slitting of the foam tip of member 114, into a plurality of separate finger-like appendages to assure that the flexible member readily conforms to the surface of an irregularly-shaped workpiece to assure a uniform pressure contact, such as the case with moldings.

In the case of a band type of saw 116, typically the effective cutting height significantly exceeds the cutting thickness of a conventional table saw. It is this capability of a band saw to cut a workpiece in excess of 6 inches or more in height that makes the aforementioned tool guide apparatus 110 an appreciated and valued accessory. Furthermore, as seen in FIG. 5, in the event that the workpiece 106 exceeds the height of the flexible member 114 an attachable extender 302 is engaged with body 120 via mounting post 304. Extender 302 further includes a T-shaped slot as well, which accommodates a flex member add-on that is substantially the same form factor as flex member 114, and may even be formed or produced as a continuous part of flexible member 114.

Figure 5:
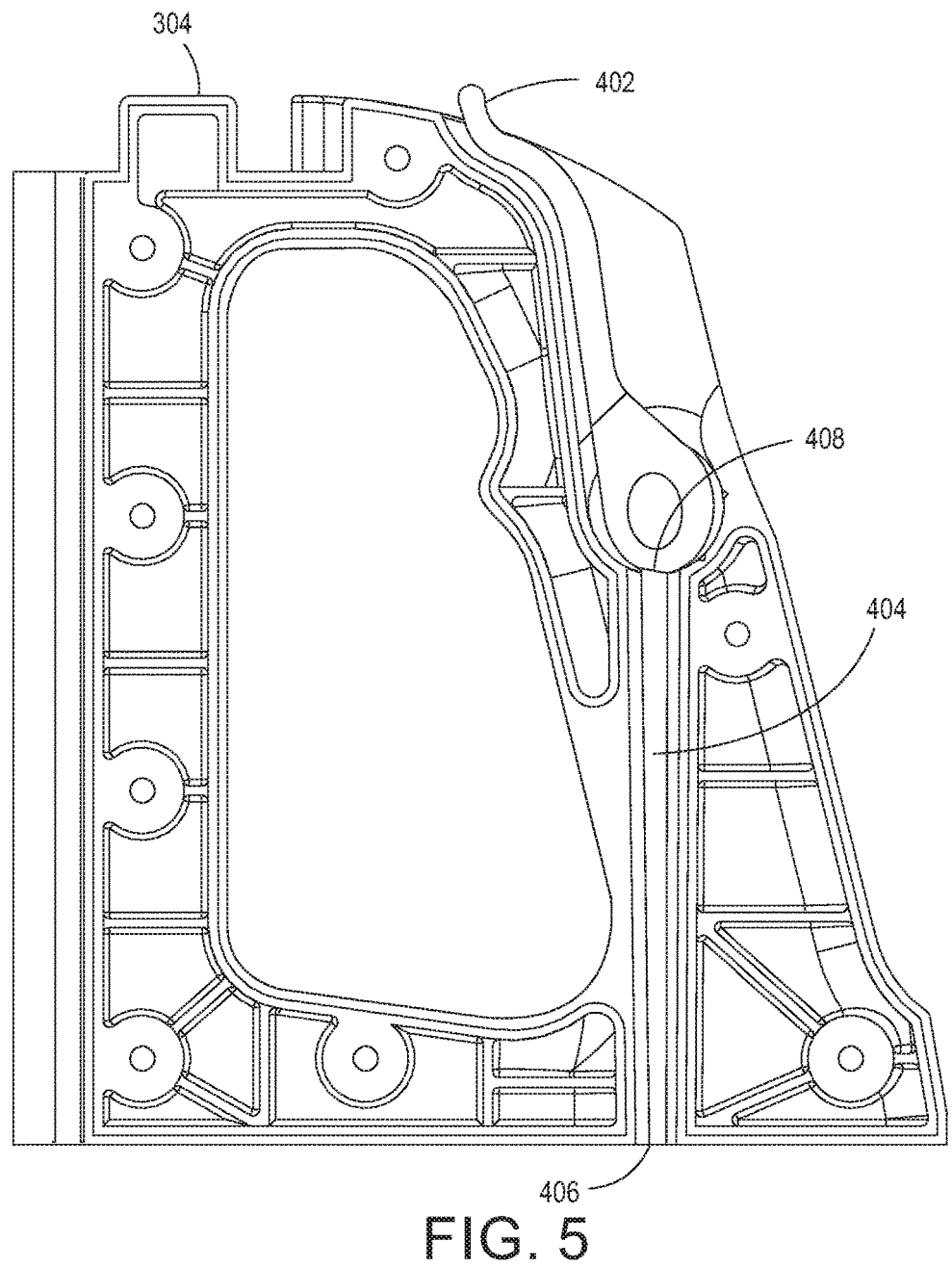
FIG. 5 is a cutaway side view of the tool guide of FIG. 4A showing details of components therein.

Referring to FIG. 4A, in view of FIG. 5, shown is a cinching mechanism comprising locking lever 402, actuator shaft 404 and tip or detent 406. Once the main body 120 is in the desired position along the length of coupler 210 the tool guide apparatus 110 is secured within the coupler 210 and to the work surface as a result of a binding force from the cam-like action of locking lever 402, applied to detent 406 via actuator shaft 404. For example the operator using a thumb to move lever 402 as seen by a comparison of FIGS. 1B and 1C. As depicted in FIG. 5 the distal end of lever 402 has a fulcrum point 408 that is offset and where the eccentricity develops a force that is applied through actuator shaft 404 and associated detent 406 to contact the interior of the "T" channel 214 of coupler 210 and thereby hold or maintain the relative position of the main body relative to the coupler or other attachment in which the main body is inserted.

Figure 6:
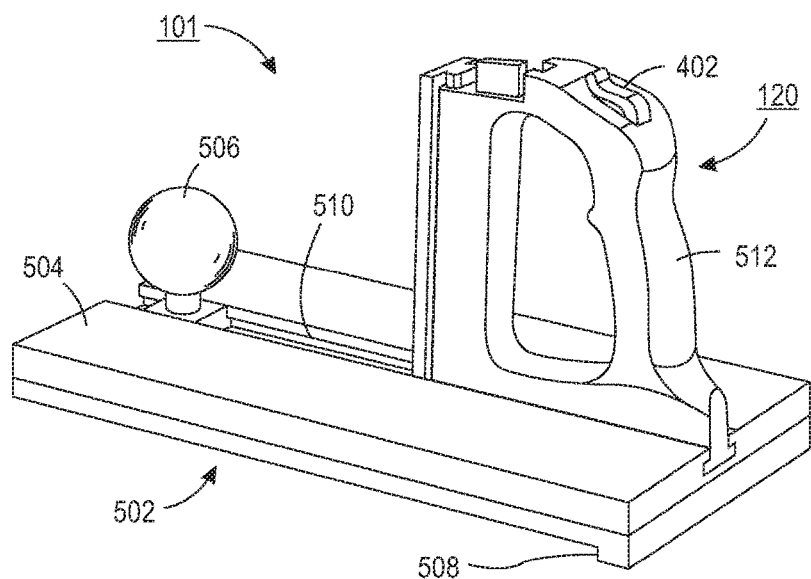
FIG. 6 shows a perspective view of the tool guide employed as a workpiece pusher in accordance with an alternative embodiment.
Figure 7:
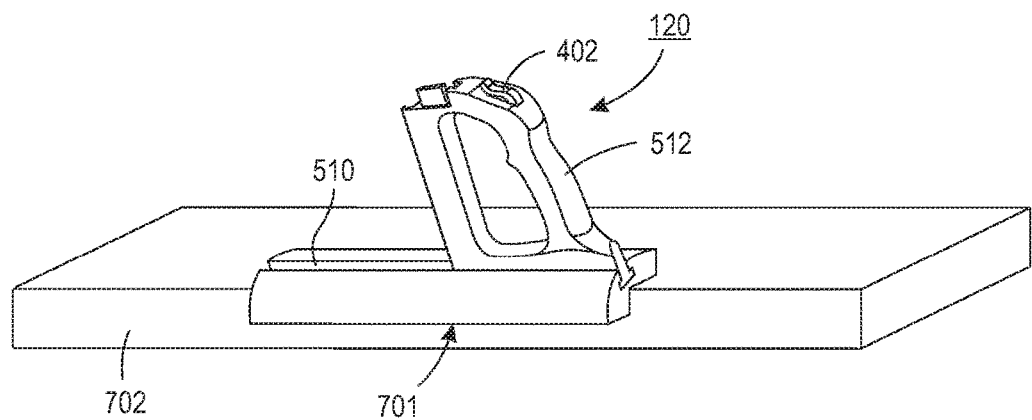
FIG. 7 shows a perspective view of the tool guide employed as an edge pusher in accordance with an alternative embodiment.

Now, referring to FIGS. 6 and 7, to alternative embodiments for the attachment are shown. In each embodiment main handle body 120 is employed to fit within an attachment in place of coupler 210. As seen in FIG. 6 pusher 101 includes back plate 504 having T-shaped channel 510 running the entire length of back plate 504, which in turn receives the compatible T-shaped bottom edge of handle or body 120. Furthermore, the forward most section of channel 510 accommodates an adjustable knob 506, which serves to provide for a two handed feeding operation to enhance directional stability of pusher 101, as well as safety. Pad 502 is conjoined to back plate 504 via conventional means, such as an adhesive or removable fasteners so as to be replaceable. Pad 502 and is made from a resilient material having a shoulder or step 508 on the distal end which engages the trailing edge of a workpiece to assist in pushing the workpiece into a cutting tool. This configuration is particularly useful in the case of a shaper or jointer, as well as a table saw, where the use of a pusher tool is most often required.

FIG. 7 shows yet another embodiment of an attachment in the form of a guide or pusher 701, whereby the main body handle 120 is adapted, in conjunction with attachment 701, to permit handling of workpiece 702 on abutting top and side surfaces. Notably this edge pushing arrangement gives ultimate control over the feeding of workpiece 702 by providing a controlling force in both the downward, forward, and inward direction relative to a cutting tool, as well as a substantially controlled in-feed pressure.

As will be appreciated from the embodiments depicted in FIGS. 6 and 7, the apparatus may be configured for use with different attachments into which the handle may be slidably engaged as described relative to the coupler. Such attachments include a base, there the base includes at least a top surface and at least one bottom surface, the top surface having the longitudinal channel for receiving the bottom edge of said main body. For example, the attachments may include various shapes of sanding block, from flat surfaced blocks to blocks having profiled surfaces for inside and outside corners, and multiple radiuses, etc. Also common on each of the alternative attachments depicted is a non-rigid (e.g., foam) workpiece contact surface attached along at least a portion of said at least one bottom surface of the base.

The use of the non-rigid materials avoids marring or deformation of the workpiece surface(s) in contact with the attachment.

In summary the use of the tool guide apparatus along with a fence on a band saw is of a primary significance when the workpiece is somewhat narrow and has a height dimension that is substantially greater than the width. For example, the stability of a workpiece is predicated on the contact area it has with the worktable, the smaller the surface contact area the less stability.

It should be understood that various changes and modifications to the apparatus and embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A tool guide apparatus comprising:
   a main body with an opening therein defining a grip about which the main body may be grasped, said main body including a bottom edge having a first mating cross-section, where said bottom edge further includes a detent; and
   at least one attachment slidably attached to the bottom edge of said main body, where said at least one attachment has a longitudinal channel therein, in a shape complimentary to the first mating cross-section, to receive the bottom edge, said at least one attachment engaged by the detent to maintain the main body in a position with the at least one attachment.

2. The apparatus according to claim 1, wherein said at least one attachment includes a table coupling mechanism to allow the main body to be employed relative to a work table.

3. The apparatus according to claim 2, wherein said table coupling mechanism includes a measuring scale along at least one surface thereof.

4. The apparatus according to claim 2, wherein said table coupling mechanism includes a longitudinal slot in a planar bottom thereof, and an adjustable cam extends beneath the planar bottom, said cam having a shoulder that slides within the slot, said adjustable cam further including a fastener for frictionally affixing the cam at a desired position along the slot, and where the cam frictionally contacts walls of a recess on the work table.

5. The apparatus according to claim 2, wherein said table coupling mechanism includes a longitudinal slot in a bottom thereof, and an adjustable post extends beneath the bottom and has a shoulder that slides within said slot, said adjustable post further including a fastener for frictionally affixing the post at a desired position along the slot, and where the post is insertable within a recess on the work table.

6. The apparatus according to claim 2, wherein said the first mating cross-section is selected from the group consisting of: T-shaped, V-shaped, keyhole-shaped.

7. The apparatus according to claim 2, wherein said main body further includes a flexible member removably attached to the main body along a side edge.

8. The apparatus according to claim 7, wherein said flexible member is attached by slidable engagement of an edge of the flexible member within the side edge of said main body.

9. The apparatus according to claim 4, wherein said main body further includes a flexible member removably attached to the main body along a side edge and where said flexible member is attached by slidable engagement of an edge of the flexible member within the side edge of said main body;
   said flexible member extends outward from the side edge of the main body such that when said cam frictionally contacts the recess on the work table said flexible member is placed into contact with a workpiece.

10. The apparatus according to claim 9, wherein said flexible member is attached by slidable engagement of an edge of the flexible member within a channel on the side edge of said main body.

11. The apparatus according to claim 10, wherein the edge of the flexible member and the channel on the side edge of said main body have complimentary cross-sections and the edge of the flexible member fits within the channel on the side edge of said main body.

12. The apparatus according to claim 1, wherein said at least one attachment includes:
   a base, said base including at least a top surface and at least one bottom surface, said top surface having the longitudinal channel therein for receiving the bottom edge of said main body; and
   a non-rigid workpiece contact surface attached along at least a portion of said at least one bottom surface of the base.

13. The apparatus according to claim 12, wherein the position of said main body may be adjusted relative to the base, and where the detent is employed to maintain the main body in a fixed position.

14. The apparatus according to claim 13, wherein said non-rigid workpiece contact includes at least a pair of abutting planar surfaces.

15. The apparatus according to claim 12, wherein said non-rigid workpiece contact surface includes a flexible material.

16. The apparatus according to claim 15, wherein the flexible material comprises an ethylene vinyl acetate foam.

17. The apparatus according to claim 1, further including an extender detachably connected on a top of said main body.

18. A tool guide apparatus comprising:
   a main body with an opening therein and defining a grip about which the main body may be grasped, said main body including a bottom edge having a T-shaped cross-section, where said bottom edge further includes a releasable detent;
   said main body further including a flexible member removably attached to the main body along a side edge, wherein said flexible member is attached by slidable engagement of an edge of the flexible member within a channel on the side edge of said main body; and
   an attachment slidably attached to the bottom edge of said main body, where said attachment includes:
      a longitudinal channel therein, in a shape complimentary to the first mating cross-section, to receive the bottom edge, said attachment engaged by the detent to maintain the main body in a position with the attachment; and
      a table coupling mechanism to allow the main body to be employed relative to a work table via the attachment;
   wherein said table coupling mechanism includes a longitudinal slot in a planar bottom thereof, and an adjustable cam extends beneath the planar bottom, said cam having a shoulder that slides within the slot, said adjustable cam further including a fastener for frictionally affixing the cam at a desired position along the slot, and where the cam frictionally contacts a recess on the work table.

19. The apparatus according to claim 18, wherein said table coupling mechanism includes a measuring scale along at least one surface thereof.

20. The apparatus according to claim 18, wherein the flexible member includes a material made with a foam.

\* \* \* \* \*